April 26, 1927.  1,625,831
H. M. STARK
APPARATUS AND PROCESS FOR LEECHING, FILTERING,
AND ABSORBING GASES AND THE LIKE
Filed Feb. 24, 1923  3 Sheets-Sheet 1
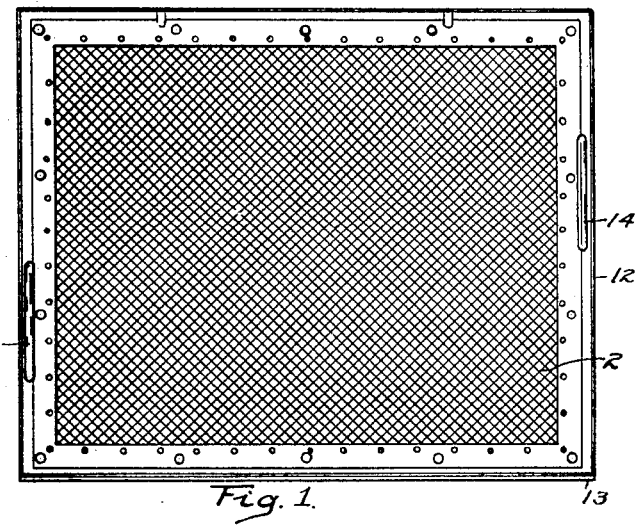
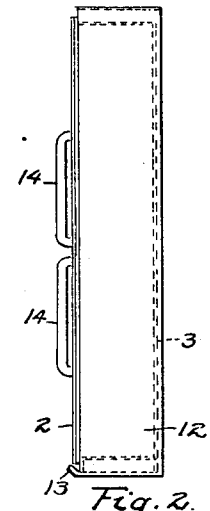
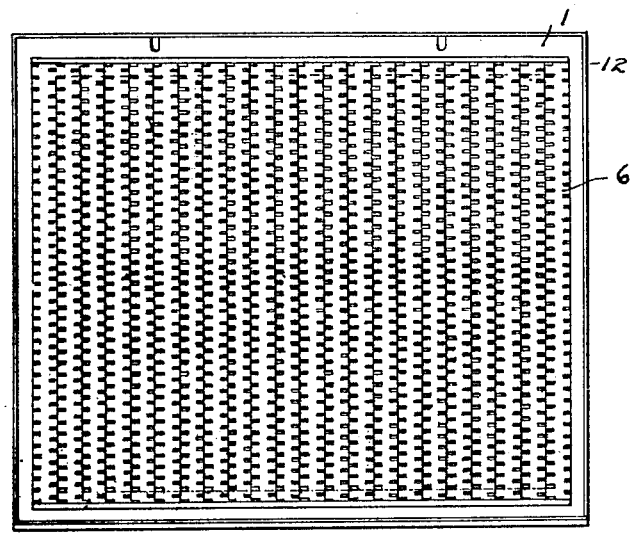
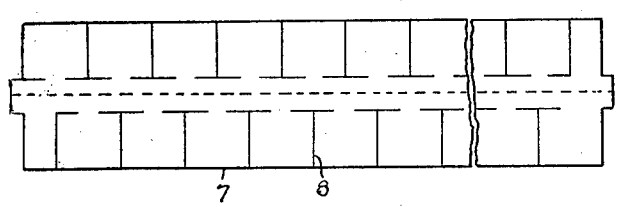
Harold M. Stark
Inventor
Attorney

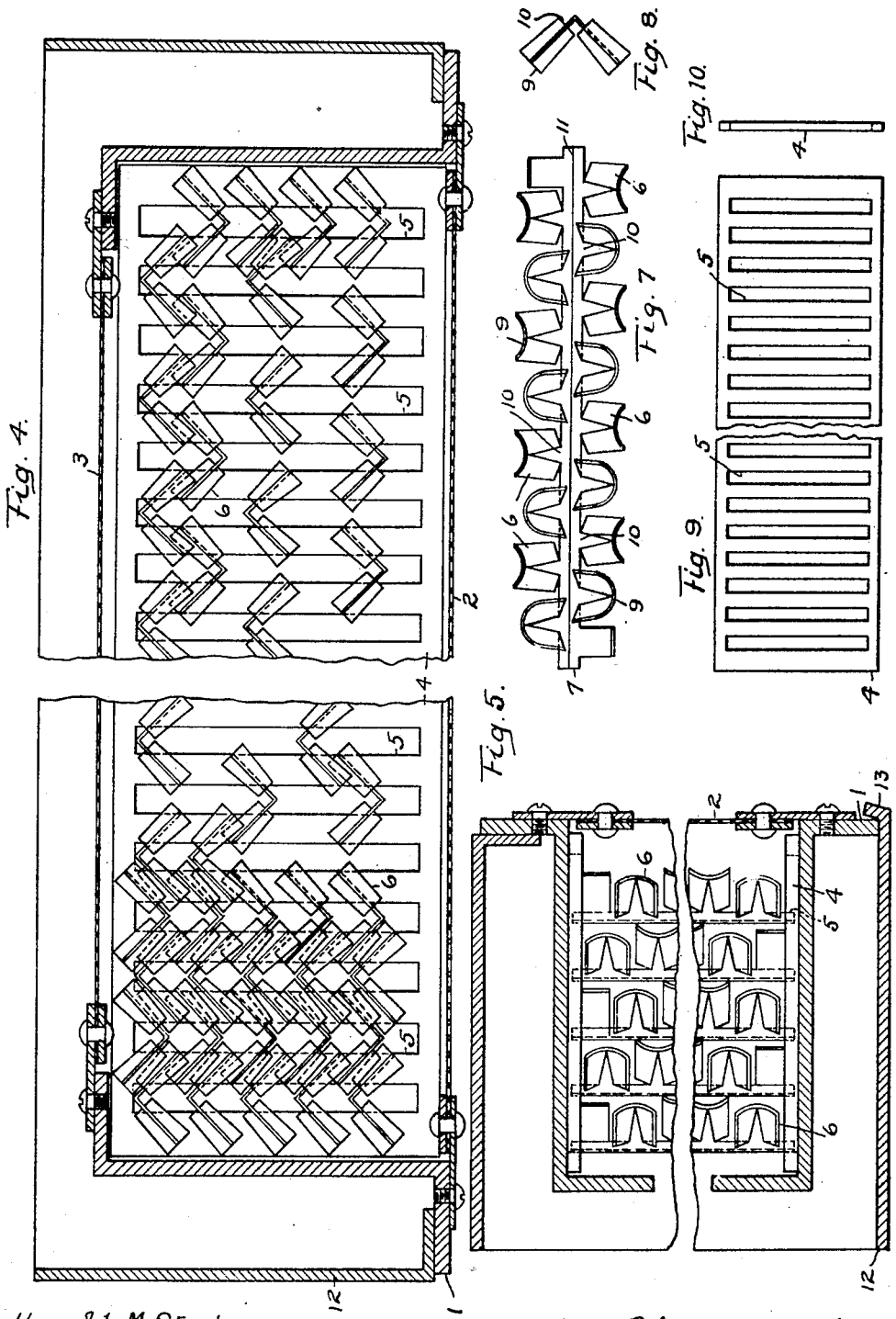

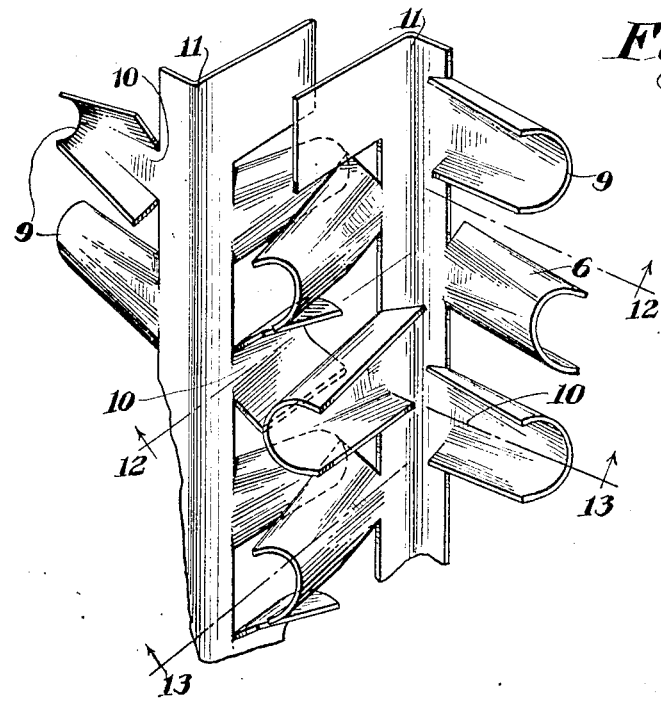
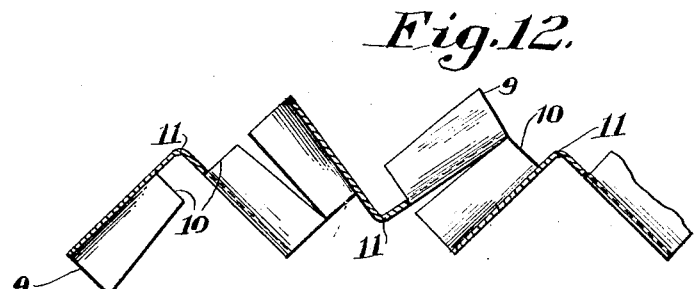
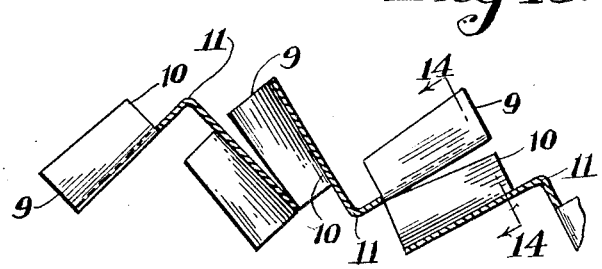
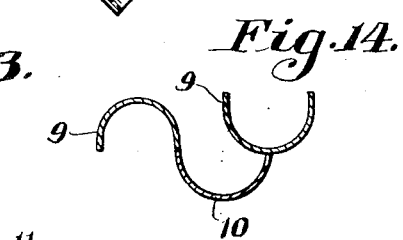

Patented Apr. 26, 1927.

1,625,831

UNITED STATES PATENT OFFICE.

HAROLD M. STARK, OF HIGHLAND PARK, MICHIGAN.

APPARATUS AND PROCESS FOR LEECHING, FILTERING, AND ABSORBING GASES AND THE LIKE.

Application filed February 24, 1923. Serial No. 620,926.

The invention relates to the art of leeching and filtering all entrained substances and impurities from air and other gases, to the art of absorbing gases in liquid solvents and to the art of physical and chemical mixtures and reactions and allied processes wherein the air or gas or other medium to be treated is caused to travel through a mechanical baffling mechanism.

Various types of mechanisms have been used heretofore for leeching, filtering and absorbing gases and for carrying on the other processes above mentioned.

Wet and dry filters have been used for many years for this purpose, in some of which oil or water is utilized to supplement an indiscriminate baffling of the gas current to secure the results. So far as I am aware no filter obtainable on the market, has been designed with a predetermined systematic arrangement of baffling elements so that the gas currents will take predetermined lines of travel through the filter disseminating the same and avoiding troublesome voids and eddy currents which interfere with the flow of the gas.

The principal object of my invention is to provide a process for the purposes described in which is utilized a constructive and systematic baffling so determined that the maximum volume of the medium to be treated may be handled through a given area, with a minimum of windage resistance necessary to induce the purification or absorption required. Other objects will appear hereinafter.

I have found that minute currents of air or other gas may be handled and diverted in a predetermined manner so as to bring all of it into physical contact with baffling surfaces at the earliest possible moment, thus enabling the application of a predetermined minimum of baffling for any particular duty required. I have also found that the angularity of diversion of the air or gas currents need not exceed 50° from the general or duct line direction of travel of the air or gas to be treated in order to produce the centrifugal effect necessary to swirl the impurities in the air or gas to the outer edges and baffle surfaces of the filling element. An angularity of 90° is entirely too great since it tends, as above stated, to create voids and eddy currents that reduce the capacity of the mechanism, increase the friction and prevent the positive contact of the air or gas currents with the baffling surfaces so placed.

I have also found that there is a distance relationship between the cross-section of the gas currents and the angularity of their diversion in accomplishing intimate contact of all the gas with the baffling surfaces. For instance, a stream of contained air one quarter inch in diameter at a velocity of five feet per second will so diffuse when diverted at 45° that all of the air in this stream will make physical contact with the diverting surfaces before reforming to take the flow through the next contained channels arranged in the general direction of flow of the air stream.

By arranging the baffling surfaces in a predetermined systematic order so that the disseminated air or gas currents will not directly conflict but will be guided through the filter in a positive and predetermined manner, all eddy currents and voids are eliminated and the velocity of the medium to be treated and the capacity of the filter will not be affected. The correct amount of deletion surface may then be utilized for varied problems to handle a maximum volume of medium per square foot of filter in each case, with a minimum of resistance.

This formulated guidance of the air or gas currents develops a principle which, for lack of an existing term, may be called the "cascade" principle of air dissemination and diversion, by means of which the air or gas is ever travelling in its general or duct line direction, and at the same time it makes intimate contact with the correct amount of adhesion surfaces for the elimination of entrained substances and impurities from the air or gas.

In the accompanying drawings I have illustrated an embodiment of the process as applied to an air filter, in which Figure 1 is a front elevational view of a device embodying the invention; Fig. 2 an end elevational view of the same; Fig. 3 a front elevational view of the same with the screen removed; Fig. 4 a horizontal cross-sectional view of the filter; Fig. 5 a vertical cross-sectional view of the same; Fig. 6 a plan view of a blank out of which a battery of the filtering elements is formed; Fig. 7 a view of one of the completed filtering elements in battery formation; Fig. 8 an end view of the element; Fig. 9 a plan view of one of the spacing members and Fig. 10 an end view of the spacing member.

Figure 11 is a perspective view of two of the baffle plates merely in which the edges of the baffle of one plate contact with the baffle of the adjacent plate to form substantially V-shaped spaces along said edges adapted to retain viscous liquid by capillary attraction, the view being restricted to a portion of said plates and being to an enlarged scale.

Figure 12 is a section on the line 12—12 of Figure 11.

Figure 13 is a section on the line 13—13, three of the baffle plates being shown on each of said sections in place of two plates shown in Figure 11.

Figure 14 is a section on the line 14—14 of Figure 13.

1 indicates a suitable frame open at the front and the back, and 2 and 3 represent screens that may be secured over said open front and back when desirable to protect the filtering elements from injury. At the top and bottom of the container are two plates 4, each of which is formed with a suitable number of slots 5, for spacing and supporting the filtering elements 6. The filtering elements in the present adaptation of the invention are formed in batteries as shown in Figs. 3, 4 and 5, and each battery is preferably stamped out of a single sheet of material 7 (Fig. 6), the slots 8 on one side of the sheet being staggered with respect to the slots on the other side or edge. The material between each two slots is turned over so that the outer edge 9 of said material forms a semicircle and at the shoulder 10 the element has a semi-hexagon form. The several elements 6 in a battery are therefore staggered with respect to each other or they may be arranged opposite each other or uniformly arranged as conditions may require or it may be preferred to arrange them. The sheet is then bent on its medial line 10 to the desired angle. As thus formed the several batteries of the elements are installed in the container, one end of each battery being inserted in a slot 5 of the lower plate 4 and the opposite end being inserted in a corresponding slot in the upper plate 4. Preferably the batteries are staggered in the slots with respect to each other.

Referring to Figs. 4 and 5 the air entering at the front side of the frame covered by the screen guard 2, will pass through the open spaces in the first transverse row of baffles 10 and pass directly into the curved surfaces or channels of the baffles in the next succeeding transverse row, while the air that passes through the baffles in the first row is guided by the channels directly into the angular spaces or portions A of the second transverse row and thence through the open spaces in said second row to the channels of the next succeeding transverse row where the operation is repeated, the same procedure taking place throughout the depth of the frame.

Where the device is used for filtering air, the elements 6 will be coated with a suitable oil. The baffles serve as troughs to catch all coarse dust particles and gravity will tend to cause them to slide down the oily surfaces. The troughs can fill with the particles trapped in them without in any way interfering or affecting the efficient operation of the entire filter assembly.

The serrated sides of each strip 7 shaped as above described, in addition to providing strength and spacing facilities, creates edges that are slightly out of parallel with the base of the strip. Thus small wedge-shaped gaps appear where the baffles touch each other. It will be observed that these wedge or V-shaped spaces are made between the edges of the baffles on one plate and the edges and convex surfaces of the baffles on the adjacent plate so that there is produced a multiplicity of fluid directing baffles arranged in closely spaced overlapping and angularly disposed points in contacting relation, it being understood that in certain instances it is not absolutely necessary to have a positive point contact but, in other cases there must be substantially a point contact. These gaps form storage points for a surplus of oil due to the viscosity of the liquid. These storage reservoirs gradually drain as the baffling becomes coated with impurities, capillary attraction serving to coat the dust with the oil, and rough adhesive surfaces throughout the filter are formed thereby which are found more efficient even than the smooth surfaces of a filter just put into service.

Each transverse row of baffle elements makes contact with the preceding transverse row and the size and shape of the baffles will be varied in accordance with the work they are to perform, the cascade principle of the air travel and baffling being maintained at all times. The amount of baffling will also vary with the service required, although if resistance, upkeep, cleaning expenses, &c., are disregarded a standard type may be used in most cases.

In filtering air I utilize a viscous oil because of its affinity for dirt, dust and other physical impurities. Water may be used in the forming of hydroxides or reagents and solvents may be used for the deletion of paint, varnish, &c. The different problems in the deleting of impurities or of absorption demand different treatment both as to the shape and extent of the baffling as well as in the composition of the materials utilized for this purpose. The formulated flexibility in the baffling which is evident from the foregoing description permits of its ready adaptation to all the various deleting or absorption problems that may arise in practice.

For convenience in supporting the frame with its baffling contents a container 12 may be used that will be fixed in position the lower edge of the front face of the frame being engaged behind the ear 13 and the upper side of the front being suitably locked to the container. The hand grips 14 afford a convenient means for handling the frame.

For most uses the strips 7 will be bent on the line 11 so that the elements on one side of the strip will form an angle of approximately ninety degrees with the elements on the opposite side of the strip, and hence each element will cause a divergence of the fluid current passing through it of approximately 45° to the general or duct line travel of the medium being treated, or within the 90° of angularity above referred to.

It will be noted that by utilizing the so-called "cascade" principle of simultaneous gas dissemination and diversion through the formulated baffle assembly I secure prompt physical contact between the gas and the baffling elements, while enabling the multiplicity of gas streams created by the baffling to maintain in a positive and formulated manner the general or duct line travel of the gas; and that I have made effective a principle of relationship between the cross-section of gas currents and the angularity of their diversion for the purpose of completing prompt and full contact of the gas with the baffling surfaces, at the same time eliminating the clashing of the gas currents by guiding them in a predetermined manner along or within 90° of the general or duct line travel of the gas or other medium to be treated.

What I claim is:

1. In a gas filter, a pair of filter plates arranged in spaced relation side by side and baffles extending from each of said plates toward the other plate, the baffles of one plate being closely spaced with respect to the baffles of the other plate to provide a multiplicity of substantially V-shaped linear capillary spaces for holding a multiplicity of drops of liquid.

2. In a gas filter, a multiplicity of layers of fluid directing baffles arranged in closely spaced overlapping and angularly disposed relation and substantially point contacting between layers to form a multiplicity of capillary reservoirs.

3. A gas filter having sets of series of baffles, each set having edges cooperating with the baffles of an adjacent set to provide substantially V-shaped reservoirs along said edges adapted to retain liquid by viscosity and distribute it by capillary action.

4. A gas filter having sets of series of baffles, each set having edges cooperating with the baffles of an adjacent set to provide substantially V-shaped reservoirs along said edges adapted to retain viscous liquid supplied by capillary attraction, said reservoirs being arranged in a definite order throughout the filter.

5. In a gas filter, a filter plate having a longitudinal edge provided with a series of baffles projecting outwardly therefrom.

6. In a gas filter, a filter plate having a longitudinal edge provided with a series of baffles projecting outwardly therefrom, said baffles being arranged in alternate curved relation to provide a series of pairs of edges in staggered relation on opposite sides of the plate.

7. In a gas filter, a filter plate having lateral portions arranged at an angle to each other, each lateral portion having a longitudinal edge provided with a series of baffles projecting outwardly therefrom.

8. In a gas filter, a filter plate having lateral portions arranged at an angle to each other, each lateral portion having a longitudinal edge provided with a series of baffles projecting outwardly therefrom, said baffles being arranged in alternate curved relation to provide a series of pairs of edges in staggered relation on opposite sides of the plate.

9. A gas filter having a multiplicity of contacting retaining substantially V-shaped capillary spaces between layers of filter plates and a viscous liquid held by its viscosity in said capillary spaces.

10. A gas filter having a series of layers of filter plates, said filter plates being arranged to provide a multiplicity of definitely arranged V-shaped capillary spaces between adjacent layers, said capillary spaces having linear sides and being adapted for retaining viscous liquid, and a viscous liquid held by its viscosity in said capillary spaces.

11. The method of operating gas filters which consist in providing a multiplicity of liquid reservoirs between layers of directing baffles positioned to receive liquid from said reservoirs, said reservoirs being arranged for gradually distributing the liquid in automatic accordance with the collection of dust particles from the gas on said baffles.

12. The method of leeching gases which consists in passing the gas over deleting surfaces to which adhesive liquid is supplied by capillary action from a multiplicity of reservoirs formed between layers of said surfaces.

13. The method of leeching gases which consists in passing the gas over movable deleting surfaces to which adhesive liquid is supplied by capillary action from a multiplicity of reservoirs formed between layers of said surfaces.

14. The method of leeching gases which consists in providing a multiplicity of reservoirs at contacting points between layers of deletion surfaces and supplied with a viscous fluid, feeding the fluid by capillary action from the reservoirs to said layers of deletion surfaces, and passing the gas over said surfaces.

In witness whereof I have hereunto subscribed my name this 17th day of February, 1923.

HAROLD M. STARK.